US006756785B2

(12) United States Patent
Peacock et al.

(10) Patent No.: US 6,756,785 B2
(45) Date of Patent: Jun. 29, 2004

(54) PRESSURE CONTROLLED DEGAS SYSTEM FOR HOT CATHODE IONIZATION PRESSURE GAUGES

(75) Inventors: Neil T. Peacock, Broomfield, CO (US); Stacy W. Wade, Boulder, CO (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 10/205,014

(22) Filed: Jul. 25, 2002

(65) Prior Publication Data

US 2004/0017202 A1 Jan. 29, 2004

(51) Int. Cl.[7] .............................................. G01L 21/30
(52) U.S. Cl. ........................ 324/460; 324/459; 324/462
(58) Field of Search ................................ 324/460, 459, 324/461, 462, 463–470; 313/7, 230, 293

(56) References Cited

U.S. PATENT DOCUMENTS

| | | | |
|---|---|---|---|
| 3,576,465 A | | 4/1971 | Harvey |
| 4,093,913 A | * | 6/1978 | O'Neal, III ................. 324/462 |
| 4,714,891 A | * | 12/1987 | Morrison, Jr. ............... 324/459 |
| 4,804,820 A | * | 2/1989 | Shoup .......................... 219/98 |
| 5,250,906 A | | 10/1993 | Bills et al. |
| 5,602,441 A | * | 2/1997 | Ohsako et al. .............. 313/230 |
| 2001/0011890 A1 | * | 8/2001 | Kawasaki ................... 324/460 |

FOREIGN PATENT DOCUMENTS

| | | |
|---|---|---|
| GB | 1 405 219 | 9/1975 |
| JP | 63151834 | 6/1988 |
| JP | 10213509 A | * 8/1998 ........... G01L/21/30 |

OTHER PUBLICATIONS

A. Berman; Total Pressure Measurements in Vacuum Technology; Vacuum Calibration Laboratory, Soreq Nuclear Research Centre, Yavne, Israel; 1985; pp. 168–171 and 190–193; Academic Press, Inc. (Harcourt Brace Jovanovich, Publishers).

(List continued on next page.)

Primary Examiner—Charles H. Nolan, Jr.
Assistant Examiner—Minh Chau
(74) Attorney, Agent, or Firm—James R. Young

(57) ABSTRACT

A method operating a hot cathode ionization pressure gauge during electron bombardment and resistance degas operations by controlling the degas power levels as a function of the gauge pressure. In one embodiment, the degas power level is increased and decreased in steps, and the gauge pressure monitored following each increase and decrease. In another embodiment the rate of change in the gauge pressure is monitored while the degas power level is increased. If it is determined from the monitored rate of change that the gauge pressure may exceed the upper limit, the degas power increases can be stopped or the degas power decreased. These operation are continued until predetermined final degas conditions are met. A display can be activated following the successful completion of the degas operation.

28 Claims, 2 Drawing Sheets

OTHER PUBLICATIONS

J. M. Lafferty; Foundations of Vacuum Science and Technology; A Wiley–Interscience publication; 1998; pp. 414–419; John Wiley & Sons, Inc.

A Roth; Vacuum Technology $2^{nd}$ ed.; pp. 312–319; North-Holland Publishing Company.

P. A Redhead, J. P. Hobson, E. V. Kornelsen; The Physical Basis of Ultrahigh Vacuum; American Vacuum Society Classics; 1993; pp. 307–308; American Institute of Physics; New York.

R. N. Peacock; Total Pressure Gauging Techniques; 1988; entire book (unnumbered pages); MKS Instruments, Inc.; Boulder, Colorado.

Paitich et al., "Wide Range Vacuum Gauge Control", Solid State Technology, May 1996, pp. 103–107.

Peacock et al., "Comparison of Hot Cathode and Cold Cathode Ionization Gauges", Journal of Vacuum Science & Technology, May/Jun. 1991, No. 3, New York, US, pp. 1977–1985.

Chen et al., "A Linearly Displayed Ionization–Gauge Controller Implemented With Automatic Range Switching", Measurement Science & Technology, Sep. 1993, No. 9, Bristol, GB, pp. 927–930.

* cited by examiner

PRESSURE CONTROLLED DEGAS SYSTEM FOR HOT CATHODE IONIZATION PRESSURE GAUGES

FIELD OF THE INVENTION

The present invention relates generally to hot cathode ionization pressure gauges. In particular, the invention is a system for controlling the degas operation in hot cathode ionization pressure gauges.

BACKGROUND OF THE INVENTION

Hot cathode ionization gauges (e.g., Bayard-Alpert gauges) are commonly used to measure very low pressures (e.g., less than $10^{-3}$ Torr) in vacuum chambers. Gauges of these types are well known and disclosed, for example, in the Harvey U.S. Pat. No. 3,576,465 and the Bills et al. U.S. Pat. No. 5,250,906. Various aspects of these gauges are also described in the following publications: A. Berman, *Total Pressure Measurements in Vacuum Technology*, pp. 168–171 and 190–193, 1985; J. M. Lafferty, *Foundations of Vacuum Science and Technology*, pp. 414–419, 1998; A. Roth, *Vacuum Technology* $2^{nd}$ ed., pp. 312–319; P. A. Redhead et al., *The Physical Basis of Ultrahigh Vacuum*, American Institute of Physics, pp. 307–308, 1993; and R. N. Peacock, *Total Pressure Gauging Techniques*, HPS Division of MKS Instrument, Inc., Boulder, Colo., 1988.

Briefly, hot cathode ionization gauges include a filament, grid and collector that are often enclosed in an envelope. During operation, a voltage (typically about 180 v) is applied to the grid by a grid supply, and a bias voltage (typically about 30 v) is applied to the filament by a filament supply. A electron current set and controlled by the instrument control system (typically about 0.1–10 mA) flows between the filament and grid. Under these operating conditions a current having a magnitude proportional to the pressure in the gauge will flow through the collector. The value of the proportionality constant, known as the gauge constant, is dependant upon a number of factors including the geometry and operating parameters of the gauge and the type of gas in the chamber. The relationship between the pressure being measured and the gauge operating parameters is defined by the following equation.

$$P = I_c / K I_e$$

where:
 P=pressure being measured
 $I_c$=collector current
 $I_e$=electron current
 K=gauge constant As described in the references listed above, it is periodically necessary to "degas" the gauge in order to enhance its measurement accuracy. The degassing operation removes gasses that have adsorbed onto the grid and other structures of the gauge. Absent the removal of these adsorbed gasses, they can be released into the measuring (ionizing) volume through various electron or ion processes during a measurement. Since this released gas was not initially in the gas phase within the gauge or system volume, its collection would add a spurious component or error term to the measurement.

There are two methods commonly used for performing degas operations. These are known as the electron bombardment (EB) and resistance ($I^2R$) methods. Both methods involve applying increased (over typical measurement mode operating conditions) power levels to the gauge until certain final degas conditions are met (e.g., 3W for a predetermined time period, or a predetermined power to obtain a heat/temperature or color in the grid). This heating is typically sufficient to bring the structure to a visible orange color when viewed in a lighted room. During an electron bombardment method degas operation the grid voltage is increased to a fixed value greater than the usual operating voltage (e.g., by a factor of 2–4 to between 300 v and 600 v) while the electron current $I_e$ is increased to a fixed value greater than the typical operating current (e.g., by a factor of about 10, to about 20 mA). The grid is effectively heated by the impact of electrons during this operation. The power applied to the gauge during a degas operation using the EB method is computed by the following formula:

$$W_{EB} = I_e(V_g - V_{fb})$$

where:
 $W_{EB}$=power applied to gauge during EB degassing
 $I_e$=electron current
 $V_g$=grid voltage
 $V_{fb}$=filament bias voltage During a resistance method degas operation the grid is ohmically heated by passing a current (e.g., about 2A) through the grid. The power applied to the gauge during a degassing operation using the $I^2R$ method is computed by the following formula:

$$W_{12R} = I_g^2 R$$

where:
 $W_{12R}$=power applied to gauge during $I^2R$ degassing
 $I_g$=grid current
 R=resistance of grid As mentioned above, the adsorbed gas driven off the gauge structures during degas operations adds to the pressure indicated by the gauge. Unfortunately, hot cathode ionization gauges are susceptible to damage if degassed at relatively high pressures (e.g., pressures greater than about $5 \times 10^{-5}$ Torr). Damage to a normally operating gauge is therefore possible if the vacuum pumping of the system to which the gauge is mounted is not able to evacuate the gas driven off during the degas operation at a rate sufficient to prevent the pressure from increasing beyond a safe operating threshold. Stripping or removal of coatings on the gauge cathode by glow discharges forming within the tube are an example of the types of damage that can be caused by degassing at relatively high pressures.

To prevent damage of this type, the gauge control system typically includes an automatic "shut off" function that continuously monitors the pressure measured by the gauge and either terminates the degas operation or ends the gauge operation altogether if the measured pressure exceeds a predetermined safe upper pressure limit. To help prevent shut-offs under these circumstances, some gauge control systems will gradually increase the degas operation power level (e.g., grid voltage or electron current) to the final degas power value. Even with such a control system function, however, the upper pressure limit can sometimes be exceeded, in which case the system will automatically shut off. Additional pressure measurement inaccuracies and associated complications with the degas operations result from the fact that the gauge constant varies with grid voltage, electron current and gauge operating pressure.

If the degas operation is terminated or the gauge operation ended by a control system of these types, action by an operator is typically required to restart the operation. This need presents substantial disadvantages when the output of the gauge is being monitored and used to control the vacuum system to which it is mounted. If the gauge is turned off, other vacuum system components requiring pressure measurements may be unnecessarily shut off. In situations where the degas operation (but not gauge operation) is terminated, the degas function required for accurate pressure measurements may not have been fully performed. Inaccuracies in subsequent pressure measurements can result. Furthermore, in many cases the operator may not even be aware that there was a degas operation over-pressure shut off since the control system often provides no indication or display to the operator as to whether the degas operation was successfully completed.

There is, therefore, a continuing need for improved degas systems for hot cathode ionization pressure gauges. In particular, there is a need for control systems and methods that enable the gauges to be effectively degassed while minimizing the possibility that the degas operation or the gauge itself will be shut down. To be commercially viable, any such system must be capable of being efficiently implemented. The system will also preferably require little if any operator action after it is started.

SUMMARY OF THE INVENTION

The present invention is an efficient-to-implement and effective degas system for hot cathode ionization pressure gauges. One embodiment of the invention includes applying degas power levels to the gauge, determining the gauge pressure and controlling the degas power level as a function of the gauge pressure. Controlling the degas power level can include increasing and decreasing the degas power level as a function of the gauge pressure to prevent the gauge pressure from reaching a predetermined upper pressure limit.

In one preferred embodiment, controlling the degas power level as a function of gauge pressure includes increasing the degas power level if the gauge pressure is less than the upper pressure limit for a predetermined settle time period. The degas power level is decreased if the gauge pressure is greater than the upper pressure limit. The power level increases and decreases can be made in steps.

In another embodiment, controlling the degas power level as a function of the gauge pressure includes monitoring rates of change of increases in the gauge pressure, determining from the rates of change in the gauge pressure whether the gauge pressure will increase to the upper pressure limit, and decreasing the power level increases if it is determined from the rates of change that the gauge pressure will increase to the upper pressure limit.

In yet other embodiments of the invention, the degas operation continues until final degas conditions are met. A display can be actuated to indicate the successful completion of a degas operation. The termination of degas operations if an overpressure situation is detected can also be displayed.

DETAILED DESCRIPTION OF THE PREFERRED EMBODIMENTS

Figure 1:
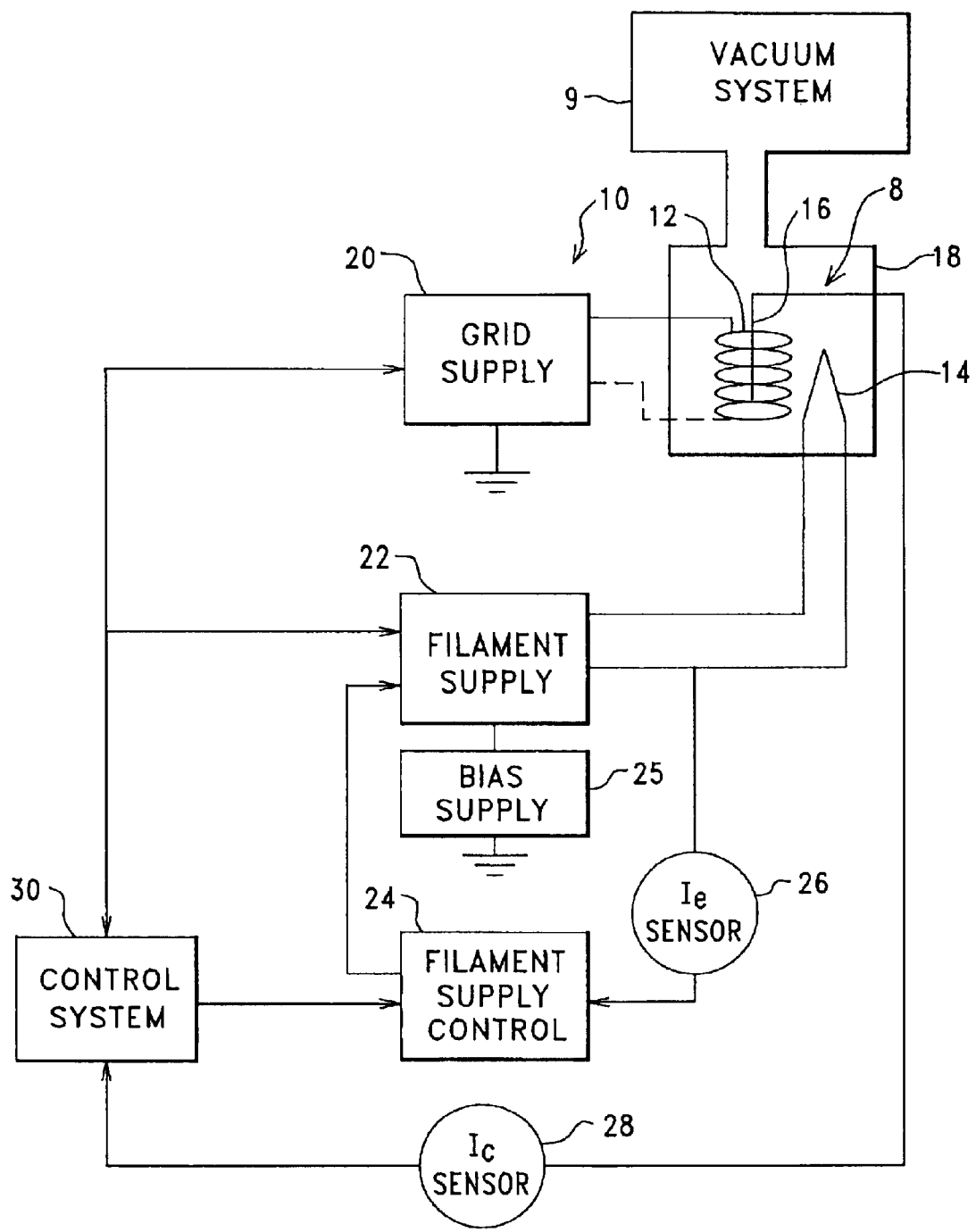
FIG. 1 is schematic diagram of a hot cathode ionization pressure gauge, and a block diagram of a gauge supply/control system that can be used to perform gauge degas operations in accordance with the present invention.

FIG. 1 is a block diagram of a hot cathode ionization pressure gauge 8 mounted to a vacuum system 9 and interconnected to a supply/control system 10 that can be operated in accordance with the present invention to degas the gauge. The gauge 8 includes a grid 12, filament 14 and collector 16, all of which are enclosed in an envelope 18. Other embodiments of gauge 8 (not shown) have an electrode structure that is inserted directly into the vacuum system 9. The illustrated embodiment of the supply/control system 10 includes grid supply 20, filament heating supply 22, filament bias supply 25, filament supply control 24, emission current ($I_e$) sensor 26, collector current ($I_c$) sensor 28 and control system 30. Supply/control system 10 can be controlled to operate the gauge 8 in both a normal pressure monitoring mode and a degas mode in accordance with the present invention. With the exception of the degas mode functionality of the control system 30 described below, the functionality of the control system 30 (i.e., during the pressure monitoring mode) and the components of the supply/control system 10 and the gauge 8, can be conventional in design and operation.

Control system 30 can be a microprocessor-based system including a display, memory and a digital-to-analog converter (not separately shown). The control system 30 is coupled to provide control signals to grid supply 20, filament supply 22, filament bias supply 25 and filament supply control 24. In response to control signals from the control system 30, grid supply 20 generates the specified grid voltage for gauge 8. During normal pressure monitoring operations, the control system will typically cause the grid supply 20 to operate at about 180 volts, and cause the filament bias supply 25 to operate at about 30 volts. Filament supply 22 generates a specified filament voltage to heat the filament, biased above ground by bias supply 25, and provide the electron current to grid 12. The filament supply 22 is turned on and off by control signals received from control system 30. The electron current provided by the supply 22 is controlled by the filament supply control 24 in response to control signals received from control system 30. During normal pressure monitoring operations the electron current will typically be in the range of 0.1–10 mA. The actual electron current is measured by sensor 26, and the measured value used by the filament supply control 24 to maintain the electron current specified by the control system 30. Measurements of the actual collector current are provided to the control system 30 by collector current sensor 28. During normal pressure monitoring operations the control system 30 can calculate the pressure within the gauge envelope 18 in a conventional manner such as that described above in the Background of the Invention section. Parameters (including gauge constants K) and control algorithms for the pressure monitoring operations can be stored in the memory (not shown) of the control system 30.

A preferred embodiment of the invention includes stored data describing the gauge constant K at a number of different gauge operating conditions. The stored data can, for example, be in the form of look-up tables of gauge constant values at different operating conditions, or data describing a mathematical relationship between the gauge constant and the operating conditions. Examples of the different gauge operating conditions include grid voltages and electron current values (e.g., degas power levels) of the gauge during the degas operations. By calculating the gauge pressure as a function of the gauge constant corresponding to the conditions to which the gauge is exposed during the degas operations, the accuracy of the pressure determinations can be enhanced.

The preferred embodiments of control system 30 are programmed to control the grid supply 20, filament supply 22 and filament supply control 24 during degas operations in accordance with the invention. Measurements of the electron current and collector current provided by sensors 26 and 28 are used as control parameters. Parameters used by the control system 30 during degas operations, including gauge constants and power change steps, can be stored in memory. During degas operations in accordance with the present invention, control system 10 causes increases in the power applied to the gauge 8 to be controlled as a function of measured gauge pressure to prevent the gauge pressure from exceeding a predetermined upper pressure limit. Generally, these power increases continue until predetermined final degas power conditions are met.

Figure 2:
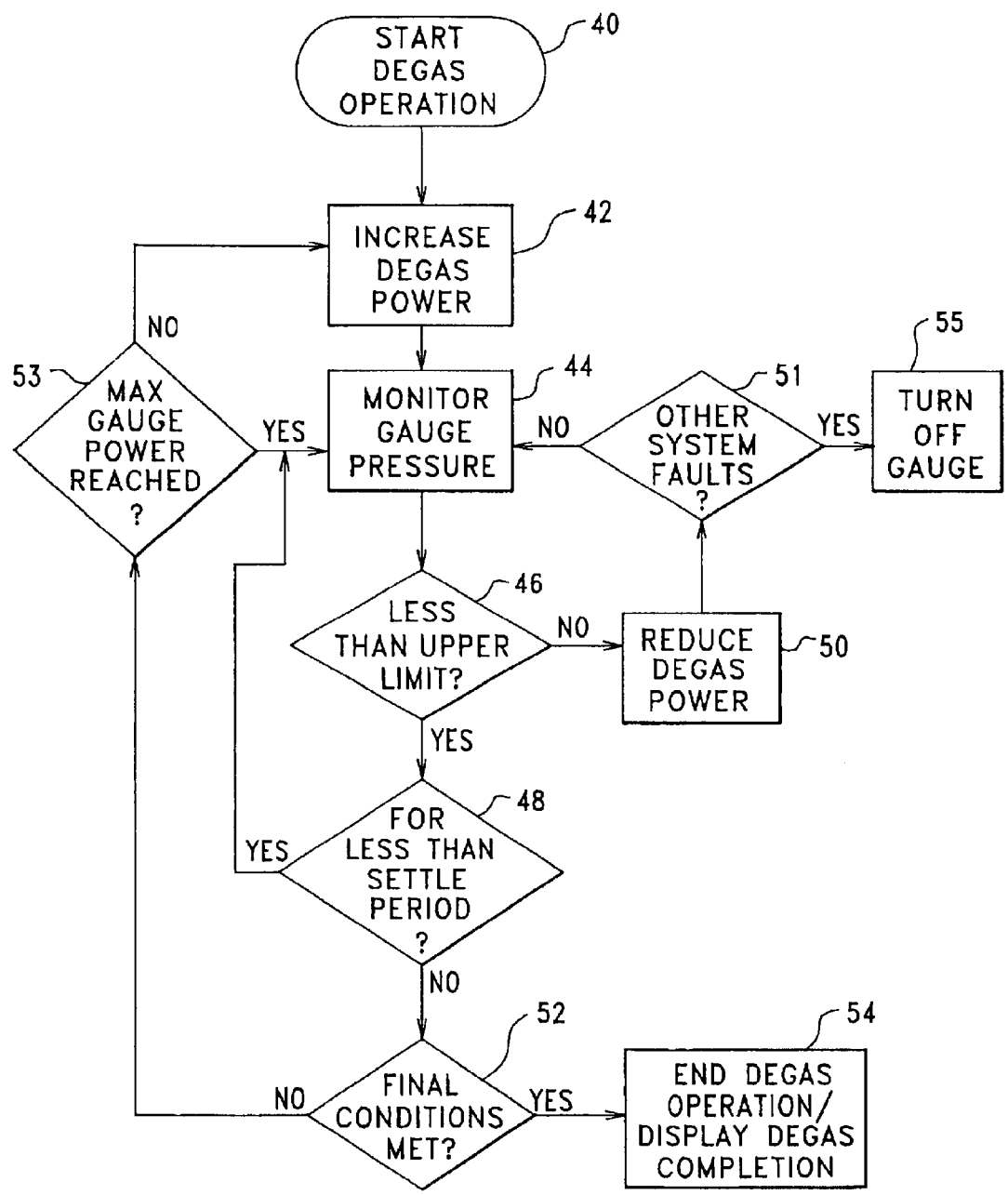
FIG. 2 is a flowchart of a control algorithm for performing a degas operation in accordance with the present invention.

FIG. 2 is a block diagram of one method for performing a degas operation in accordance with the invention. An operator will typically begin a degas operation by actuating a switch or other interface (not shown) of the control system 30 (step 40). The power applied to the gauge 8 is then increased by a predetermined amount or at a predetermined rate over the power level at which the device operates during normal pressure monitoring operations. This power level increase step is illustrated generally at 42. During electron bombardment (EB) degas operations, for example, the control system 30 will typically cause the grid supply 20 to operate at a predetermined voltage in the 300–600 volt range. Subsequent power increases at step 42 can be accomplished by causing the filament supply 22 to increase the electron current during the degas operation.

In one embodiment, the power increases at step 42 are made in discrete steps (e.g., increments of about 0.1 W), with settle time periods (e.g., about 1 sec) between the increases to allow the pressure in the gauge 8 to reach an equilibrium value. The pressure within the gauge 8 is then computed by the control system 30 as shown at step 44. If the monitored pressure is less than a predetermined "safe" upper pressure limit (e.g., $5 \times 10^{-5}$ Torr) (step 46) but the settle time period has not elapsed (step 48), these steps 44–48 are repeated. In effect, the pressure within gauge 8 can be periodically monitored (e.g., every 1 sec) during the settle time period. If at any time it is determined at step 46 that the monitored pressure has exceeded the upper pressure limit, the degas power can be decreased as shown at step 50. In a preferred embodiment the degas power is decreased in 0.1 W steps at step 50. It is possible that overpressure situations might be caused by system faults unrelated to the degas process. Accordingly, control system 30 determines at step 51 whether any other vacuum system faults or overrides are active. If so, the gauge is turned off at step 55 to prevent damage. If no other system faults are identified at step 51, the system returns to the gauge monitoring step 44.

If the measured pressure stays below the upper pressure limit during the settle period, and a predetermined maximum gauge power such as 3 W has not been reached (step 53), the degas power is again increased at step 42 and the monitoring steps 44–48 repeated. These power increase and pressure monitoring steps 42–48 are repeated until predetermined final degas conditions are met (e.g., when the degas power has increased to 3 W for a predetermined time period) (step 52). If the final degas conditions have been met, the degas operation is ended as shown at step 54. Control system 30 can also actuate a display to indicate the successful completion of a degas operation. If it is determined at step 53 that the maximum gauge power has been reached, the control system 30 returns to the gauge monitoring step 44.

During degas operations, the degas functionality of control system 30 effectively acts as a digital potentiometer when performing the stepped degas power ramp up described above. This control and feedback functionality can also be accomplished with analog control loops, pulse width modulation (PWM) or other digital-to-analog conversion approaches.

In other embodiments of the invention, the control system 30 increases the degas power while monitoring and computing both the current gauge pressure and rates of change in gauge pressure. The degas power can be increased continuously in this embodiment. If at any time it is determined on the basis of the monitored rates of pressure change that the gauge pressure may exceed the upper pressure limit, the degas power level increases can be decreased by the control system 30 (e.g., the degas power level increases can be slowed, or the power level held constant or decreased). In short, many different control algorithms can be implemented by control system 30 to provide the degas operation of the present invention.

Degas operations in accordance with the present invention offer a number of important advantages. By controlling power increases as a function of the monitored pressure it is possible to minimize the possibility that the gauge will be subjected to an over pressure situation requiring the gauge to be turned off or the termination of the degas operation. The accuracy of pressure measurements made during normal operation of the gauge are thereby enhanced. If an over pressure situation is encountered, the operator can be accurately informed of the corrective action taken by the system. The degas function can also be efficiently implemented in the supply/control system of the gauge.

Although the present invention has been described with reference to preferred embodiments, those skilled in the art will recognize that changes can be made in form and detail without departing from the spirit and scope of the invention. As an example, although the preferred embodiment is described in connection with the electron bombardment degas technique, the invention can be used in connection with the resistance degas technique as well.

What is claimed is:

1. A method for operating an ionization pressure gauge during degas operations, including:

applying degas power levels to the gauge;

determining the gauge pressure; and controlling the degas power level as a function of the gauge pressure, including increasing the degas power level as a function of the gauge pressure to prevent the gauge pressure from reaching a predetermined upper pressure limit.

2. The method of claim 1 wherein controlling the degas power level as a function of the gauge pressure includes increasing the degas power level if the gauge pressure is less than the upper pressure limit.

3. The method of claim 1 wherein controlling the degas power level as a function of gauge pressure includes increasing the degas power level if the gauge pressure is less than the upper pressure limit for a predetermined settle time period.

4. The method of claim 1 wherein controlling the degas power level as a function of gauge pressure includes increasing the degas power level if the gauge pressure is less than the upper pressure limit for a predetermined settle time period and predetermined final degas conditions are unmet.

5. The method of claim 1 wherein controlling the degas power level as a function of the gauge pressure includes increasing the degas power level as a function of the gauge pressure until predetermined final degas conditions are met.

6. The method of claim 1 wherein increasing the degas power level includes increasing the degas power levels in steps.

7. The method of claim 1 wherein controlling the degas power level further includes decreasing the degas power level.

8. The method of claim 1 wherein controlling the degas power level as a function of the gauge pressure includes:
monitoring rates of change of increases in the gauge pressure;
determining from the rates of change in the gauge pressure whether the gauge pressure will increase to the upper pressure limit; and
decreasing the increases in the power level if it is determined from the rates of change in gauge pressure that the gauge pressure will increase to the upper pressure limit.

9. The method of claim 1 and further including terminating the degas operation when predetermined degas conditions are met.

10. The method of claim 1 and further including applying measurement mode power levels to the gauge after termination of the degas operation.

11. The method of claim 1 wherein the degas operation is performed by the resistance method.

12. The method of claim 1 wherein the degas operation is performed by the electron bombardment method.

13. The method of claim 1 wherein controlling the degas power level further includes changing a rate of increases in the degas power level as a function of the gauge pressure.

14. The method of claim 13 wherein changing the rate of increases in the degas power level includes decreasing the degas power level as a function of the gauge pressure.

15. The method of claim 1 wherein determining the gauge pressure includes determining the gauge pressure as a function of a gauge constant corresponding to conditions to which the gauge is subjected during the degas operations.

16. A method for operating an ionization pressure gauge during degas operations, including:
applying degas power levels to the gauge;
determining the gauge pressure; and
controlling the degas power level as a function of the gauge pressure, including increasing and decreasing the degas power level as a function of the gauge pressure to prevent the gauge pressure from reaching a predetermined upper pressure limit.

17. The method of claim 16 wherein controlling the degas power level includes:
increasing the degas power level if the gauge pressure is less than the upper pressure limit; and
decreasing the degas power level if the gauge pressure is greater than the upper pressure limit.

18. The method of claim 17 wherein controlling the degas power level includes controlling the degas power level as a function of the gauge pressure until predetermined final degas conditions are met.

19. The method of claim 16 wherein controlling the degas power level includes increasing and decreasing the degas power level as a function of the gauge pressure until predetermined final degas conditions are met.

20. The method of claim 16 wherein determining the gauge pressure includes determining the gauge pressure as a function of a gauge constant corresponding to conditions to which the gauge is subjected during the degas operations.

21. A hot cathode ionization pressure gauge degas control system for controlling degas power levels as a function of the gauge pressure, including means for increasing and decreasing the degas power level as a function of the gauge pressure to prevent the gauge pressure from reaching a predetermined upper pressure limit.

22. The degas control system of claim 21 wherein the means for increasing and decreasing the degas power level includes:
means for increasing the degas power level if the gauge pressure is less than the upper pressure limit; and
means for decreasing the degas power level if the gauge pressure is greater than the upper pressure limit.

23. The degas control system of claim 21 wherein the means for increasing the degas power level includes means for increasing the degas power level if the gauge pressure is less than the upper pressure limit for a predetermined settle time period.

24. The degas control system of claim 21 wherein the means for increasing and decreasing the degas power level includes means for increasing and decreasing the degas power level as a function of the gauge pressure until predetermined final degas conditions are met.

25. The degas control system of claim 21 wherein the means for increasing and decreasing the degas power level includes means for increasing and decreasing the degas power level in steps.

26. The degas control system of claim 21 wherein the control system further includes means for:
monitoring rates of change of increases in the gauge pressure;
determining from the rates of change in the gauge pressure whether the gauge pressure will increase to the upper pressure limit; and
decreasing the increases in the power level if it is determined from the rates of change in gauge pressure that the gauge pressure will increase to the upper pressure limit.

27. The degas control system of claim 21 wherein the control system further includes means for terminating the degas operation when predetermined degas conditions are met.

28. The degas control system of claim 21 and further including means for determining the gauge pressure as a function of a gauge constant corresponding to conditions to which the gauge is subjected during the degas operations.

* * * * *